United States Patent
Kmec et al.

(10) Patent No.: US 6,846,452 B2
(45) Date of Patent: Jan. 25, 2005

(54) SCALE INHIBITOR FOR AN AQUEOUS SYSTEM

(75) Inventors: Pavol Kmec, Hamburg, NJ (US); Dwight E. Emerich, Lincoln Park, NJ (US)

(73) Assignee: Ashland Inc., Dublin, OH (US)

( * ) Notice: Subject to any disclaimer, the term of this patent is extended or adjusted under 35 U.S.C. 154(b) by 203 days.

(21) Appl. No.: 10/156,990

(22) Filed: May 29, 2002

(65) Prior Publication Data

US 2003/0091467 A1 May 15, 2003

Related U.S. Application Data

(63) Continuation-in-part of application No. 09/351,524, filed on Jul. 12, 1999, now abandoned.
(60) Provisional application No. 60/093,259, filed on Jul. 17, 1998.

(51) Int. Cl.[7] ............................................. C23F 11/167
(52) U.S. Cl. ........................ 422/17; 422/15; 252/180; 252/389.23; 210/699
(58) Field of Search .................... 422/15, 17; 252/180, 252/389.2, 389.23; 210/699

(56) References Cited

U.S. PATENT DOCUMENTS

| | | | |
|---|---|---|---|
| 4,432,879 A | 2/1984 | Greaves et al. | 210/699 |
| 4,892,898 A | 1/1990 | Leighton et al. | 524/3 |
| 4,915,845 A | 4/1990 | Leighton et al. | 210/701 |
| 5,078,879 A | 1/1992 | Gill et al. | 210/699 |
| 5,078,891 A | 1/1992 | Sherwood et al. | 210/6.99 |
| 5,271,862 A | 12/1993 | Freese | 252/181 |
| 5,277,823 A | 1/1994 | Hann et al. | 210/696 |
| 5,386,038 A | 1/1995 | Davis et al. | 549/262 |
| 6,645,384 B1 | 11/2003 | Richardson et al. | 210/699 |

FOREIGN PATENT DOCUMENTS

JP          02290986 A   * 11/1990

* cited by examiner

*Primary Examiner*—Elizabeth McKane
(74) *Attorney, Agent, or Firm*—David L. Hedden

(57) ABSTRACT

This invention relates to a composition and a method for inhibiting the formation of scale, particularly complex scale, in an aqueous system where more than one type of scale is present. The scale typically present in the aqueous system includes silica, silicates, and carbonates. The scale inhibiting composition comprises (1) 2-phosphonobutane-1,2,4-tricarboxylic acid and salts thereof, and (2) a copolymer of (1) one or more allyloxybenzenesulfonate monomers, and (2) one or more water-soluble acrylic monomers, substituted acrylic monomers, or mixtures thereof.

5 Claims, No Drawings

SCALE INHIBITOR FOR AN AQUEOUS SYSTEM

CROSS-REFERENCE TO RELATED APPLICATIONS

This application is a continuation-in-part of U.S. application Ser. No. 09/351,524 filed on Jul. 12, 1999 now abandoned which claims benefit of Provisional Application No. 60/093,259 filed Jul. 17, 1998.

CLAIM TO PRIORITY

Applicants hereby claim priority to U.S. application Ser. No. 09/351,524 filed on Jul. 12, 1999, which is hereby incorporated by reference.

FIELD OF THE INVENTION

This invention relates to a composition and a method for inhibiting the formation of scale, particularly complex scale, in an aqueous system where more than one type of scale is present. The scale typically present in the aqueous system includes silica, silicates, and carbonates. The scale inhibiting composition comprises (1) 2-phosphonobutane-1,2,4-tricarboxylic acid and salts thereof, and (2) a copolymer of (1) one or more allyloxybenzenesulfonate monomers, and (2) one or more water-soluble acrylic monomers, substituted acrylic monomers, or mixtures thereof.

BACKGROUND OF THE INVENTION

"Silica" deposits are not pure silica but a complex mixture of polymeric silica, calcium silicate, magnesium silicate, calcium carbonate, and smaller amounts of other inorganic compounds. In most of the aqueous systems, where there is a need to inhibit silica or silicate scale, there is also a need for the simultaneous inhibition of the calcium carbonate scale, and the need to disperse silt and the bulk water precipitation of silica, silicates and carbonates.

Some of the most difficult deposits encountered in cooling, reverse osmosis, mining and geothermal water systems are those comprised of silica. The temperature and pH of the water affects silica precipitation and deposit formation. The pH of geothermal brines is generally 4.0 to 6.0 and the brine temperature is generally about 100° C. to 210° C. The temperature of cooling water is generally about 30° C. to 80° C. and the pH is generally about 6.0 to 9.0. Cooling water is also exposed to cathodic microenvironments within corrosion cells on the metallic heat transfer surfaces where the pH is about 9.0 to 9.5 and higher.

Several methods are used to prevent or inhibit silica deposits. The simplest method involves keeping silica, calcium and magnesium below the critical concentration levels necessary for the precipitation of silicates. The critical concentrations suggested by the water treatment industry are: (1) at pH<7.5, silica (as $SiO_2$)<200 ppm; and (2) at pH>7.5, silica (as $SiO_2$)<100 ppm. If magnesium is present then (expressing Mg as ppm $CaCO_3$ and Si as ppm $SiO_2$), the recommended concentrations are (1) at pH<7.5 (Mg×Si) is <40,000, and (2) at pH>7.5 (Mg×Si) is <20,000.

Various chemical treatment methods have been developed that inhibit silica/silicate and other scale/deposits. Anionic polymers, cationic polymers, organic phosphonates, boric acid, and its sodium salts are described in the patent literature. Of particular interest is U.S. Pat. No. 5,078,879 which discloses a method for controlling silica/silicate deposition in a aqueous system with an admixture of 2-phosphonobutane-1,2,4-tricarboxylic acid and a water-soluble polymers based on acrylic and sulfonic monomers, but not on the allyloxybenzenesulfonate monomer..

Scale inhibitors are needed which will inhibit multiple scales very efficiently in an economical way. Currently the most effective silica/silicate anti-scalant is an acrylic terpolymer from Rohm&Haas sold under the trade name ACUMER® 5000. ACUMER 5000 is disclosed in U.S. Pat. No. 5,277,823. The exact composition of ACUMER 5000 is not disclosed, but the above mentioned patent gives strong indication that the polymer consists of selection of monomers such as AMPS, acrylic, maleic and others but not allyloxybenzenesulfonate monomer. This low molecular weight, water-soluble polymer is an excellent anti-scalant, but it is expensive. Thus there is a need for anti-scalants that have equal or improved effectiveness, but which are less expensive than ACUMER 5000.

U.S. Pat. No. 4,915,845 discloses the use of water-soluble polymers of allyloxybenzenesulfonate monomer and their use in aqueous systems in dispersing particulate matter, particularly drilling mud. Although the above mentioned polymer is also claimed as an inhibitor for the mineral scale in an aqueous systems but not specifically for the inhibition of silica and silicates and not in an admixture with other inhibitors.

SUMMARY OF INVENTION

This invention relates to a scale inhibitor composition and a method for inhibiting the formation of scale, particularly complex scale, in an aqueous system where more than one type of scale is present. The scale typically present is silica ($SiO_2$), silicates (e.g. $MgSiO_3$), and carbonates (e.g.$CaCO_3$), and the complex scale is a mixture thereof. The scale inhibiting treatment composition comprises (1) 2-phosphonobutane-1,2,4-tricarboxylic acid and salts thereof, and (2) a copolymer of (1) one or more allyloxybenzenesulfonate monomers, and (2) one or more water-soluble acrylic monomers, substituted acrylic monomers, or mixtures thereof.

The scale inhibiting treatment composition not only inhibits scale and complex scale formation very efficiently, but it does so very economically. The composition works as effectively or more effectively than ACUMER 5000, and is less expensive to use.

BEST MODE AND OTHER MODES

It is known that 2-phosphonobutane-1,2,4-tricarboxylic acid (PBTC) is a well known scale inhibitor. For purposes of this invention, 2-phosphonobutane-1,2,4-tricarboxylic acid (PBTC) shall also include salts thereof. PBCT is disclosed in may U.S. Patents, for instance U.S. Pat. Nos. 4,432,879 and 5,078,879, which are hereby incorporated into this specification by reference. The water-soluble copolymers of an acrylic or substituted acrylic monomer and allyloxybenzenesulfonate monomer used in the invention are disclosed in the U.S. Pat. Nos. 4,892,898 and 4,915,845, which are hereby incorporated into this specification. These copolymers have a weight average molecular weight of about 1,000 to 5,000,000, preferably from 1,000 to 250,000.

The acrylic/substituted acrylic monomer preferably used is selected from the group consisting of acrylic acid, methacrylic acid, alkyl and hydroxyalkyl substituted acrylic acid, and the alkali metal, alkaline earth metal, and ammonium salts thereof. The water-soluble copolymers comprise at least 1 mole percent of the allyloxybenzenesulfonate monomer, preferably from 2 to 15 mole percent. The molar ratio of the allyloxybenzenesulfonate monomer to acrylic monomer in the water-soluble copolymer typically ranges from about 1:99 to 20:80, preferably 2:98 to 15:85. The water-soluble copolymers may be prepared by any number of conventional means well known to those skilled in the art including, for instance, in bulk, emulsion, suspension, precipitation, or solution polymerization.

The weight ratio of the 2-phosphonobutane tricarboxylic acid to water-soluble copolymer in the scale inhibitor is from 20:1 to 1:20, preferably 1:2 to 2:1.

The scale inhibitors are used by adding to an aqueous system such as; cooling water, boiler water, reverse osmosis and geothermal/mining water, in amounts from 0.1 to 1000 ppm, but preferably from 1.0 to 100.0 ppm.

Other components may be added to the scale inhibitor composition, such as corrosion inhibitors, surfactants, or agents that inhibit microbiological growth..

Abbreviations

The following abbreviations are used in the Examples:
ACUMER® 5000=acrylic/sulfonic nonionic terpolymer available from Rohm&Haas.
CAABS=a copolymer of allyloxybenzenesulfonate and acrylic/substituted acrylic monomer, along the lines of the copolymers disclosed in U.S. Pat. Nos. 4,432,879 and 5,078,879, and which is available from Alco Chemical.
PBTC=2-phosphonobutane-1,2,4-tricarboxylic acid available from Bayer as Bayhibit AM.
TF=anti-scalant within the scope of the invention consisting of 15% PBTC (50% actives), 28% CAABS (40% actives), and 57% deionized (DI) water.

EXAMPLES

The examples, which follow, will illustrate specific embodiments of the invention. These examples along with the written description will enable one skilled in the art to practice the invention. It is contemplated that many equivalent embodiments of the invention will be operable besides those specifically disclosed. All parts are by weight of solids and all temperatures are in degrees centigrade unless otherwise specified.

In these examples, ACUMER 5000, CAABS, and PBTC, and TF were evaluated as anti-scalants for various deposits. The efficacy of the additives was tested using the following tests: (1) Magnesium Silicate Shaker Test, (2) Silica Shaker Test (pH 8.5), and (3) Calcium Carbonate Shaker Test.

Tests Based on the Magnesium Silicate Shaker Test

In this test, the concentration of each reactant ($MgCl_2$, $Na_2SiO_3$) was 600 ppm as $MgSiO_3$. The pH of the test solution was about 10.2 at the start and about 9.5 at the end of the test. The pH of the test water simulates the high pH of a cathodic site on the corroding metal. The turbidity, measured in FTU units with a DR 2000 spectrophotometer, was used for the comparison of anti-scalants. A turbidity of 10 FTU units or less was taken as a measure of a clear solution. The concentration of anti-scalant required to maintain a clear solution was then used as a measure of an anti-scalant efficacy. The efficacy of an anti-scalant is inversely proportional to the minimum concentration of an anti-scalant required to maintain a clear test solution.

Procedure

To a 125 ml conical plastic flask measure 5.0 ml of $MgCl_2$ solution (24.0 g of $MgCl_2.6H_2O$ per liter of DI water) and the desired amount of an anti-scalant. Add 90.0 ml of 80° C. to 81° C. warm DI water and immediately add 5.0 ml of $Na_2SiO_3$ solution (15.1 g of $Na_2SiO_3$ per liter of DI water) and immediately put covered flask on the shaker for 30 minutes at 250 rpm. After 30 minutes take the flask out and cool at room temperature for 30 minutes, then shake the flask until a uniform dispersion of the precipitated flocks is obtained (2–5 seconds) and measure the turbidity of such uniform sample in FTU units using DR 2000 spectrophotometer. The dosage of additive to maintain a clear solution was determined. The lower this dosage the better the additive. The results of these experiments are shown in Table I

TABLE I ($MgSiO_3$ SHAKER TEST)
Test conditions:
Mg = 600 ppm as $MgSiO_3$;
$Na_2SiO_3$ = 600 ppm as $MgSiO_3$;
pH = 10.2–9.5.
Shaker time = 30 minutes at 250 rpm and 60–63° C.

| ADDITIVE | MINIMUM PPM REQUIRED |
|---|---|
| ACUMER 5000 | 250 |
| CAABS | 250 |
| PBTC (50%) | 300 |
| TF | 265 |

The results in Table I indicate that the Test Formulation (TF) performed better than PBTC and about the same as ACUMER 500 and CAABS in the Magnesium Silicate Shaker Test.

Tests Based on the Silica (pH-8.5) Shaker Test

In this test the concentration of $CaCl_2.2H_2O$ was 600 ppm as $CaSiO_3$ and the concentration of $Na_2SiO_3$ was 1800 ppm as $CaSiO_3$. The pH of the test water was adjusted to 8.5 to simulate the conditions of bulk cooling water and conditions in other applications (e.g. mining, geothermal). The minimum concentration of each anti-scalant required to maintain a clear test solution was determined visually. The efficacy of an anti-scalant is inversely proportional to the (minimum) concentration of an anti-scalant required to maintain a clear test solution.

Procedure

To a 125 ml conical plastic flask, measure 90.0 ml of $Na_2SiO_3$ solution (4.2 g of $Na_2SiO_3$ dissolved in 2 liters of DI water and pH adjusted to 8.5 with diluted HCl). Into each flask add desired amount of an anti-scalant solution (pH 8.5). Add 10 ml $CaCl_2$ solution (7.6 g of $CaCl_2.2H_2O$ per liter of DI water). Put each covered flask on the shaker at 60°–63° C. and 250 rpm for 5 hours. After 5 hours cool the flask at the room temperature for about 30 minutes and visually determine the presence or lack of flocks in the test solution. The minimum ppm of additive solids required to maintain a clear solution is determined. A lower dosage of additive would be a better inhibitor. Results of these experiments are shown in Table II.

TABLE II

SILICA SHAKER TEST (pH 8.5)
Test Conditions:
Ca = 600 ppm as CaSiO$_3$, Na$_2$SiO$_3$ = 1800 ppm as CaSiO$_3$, pH = 8.5
Shaker Time = 4–5 hours at 250 rpm and 60–63° C.

| ADDITIVE | MINIMUM OF PPM REQUIRED |
|---|---|
| ACUMER 5000 | 250 |
| CAABS | 200 |
| PBTC, 50% | 50 |
| TF | 95 |

The results in Table II indicate that the Test Formulation (TF) performed much better than ACUMER 500 and CAABS and not quite as good as PBTC and in the Silicate Shaker Test.

CaCO$_3$ Shaker Test

In this test, the test water was prepared in the 125 ml glass shaker flask by mixing 90.0 ml of DI water with 5.0 ml of calcium chloride stock solution (12.5 g CaCl$_2$.2H$_2$O/liter) plus less than 1.0 ml of anti-scalant solution, and 5.0 ml of carbonate stock solution (3.45 g Na$_2$CO$_3$ plus 5.46 g NaHCO$_3$ per liter). The calcium concentration of the resulting test water was 425 ppm as CaCO$_3$, had an alkalinity of 325 ppm as CaCO$_3$, and an initial pH of about 9.1. The covered flasks were the put on the shaker for 16–18 hours at 250 rpm and 50° C. After 16–18 hours the contents of flasks were filtrated through #5 Whatman filter paper and the filtrate was titrated with EDTA solution to determine its calcium content. The amount of the calcium in the filtrate expressed as a percent fraction of its initial concentration is % calcium inhibition. Higher % inhibition corresponds to the higher efficacy of an anti-scalant. Results of these experiments are shown in Table III.

TABLE III

(CaCO$_3$ Shaker Test)
Test conditions:
Ca = 425 ppm as CaCO$_3$; total alkalinity = 325 ppm as CaCO$_3$; pH = 9.1.
Shaker Time = 16–18 hours at 250 rpm and 50° C.

| ADDITIVE | PPM OF ADDITIVE | % Ca AS CaCO$_3$ INHIBITION |
|---|---|---|
| ACUMER 5000 | 25 | 34.1 ± 5.1 |
| CAABS | 25 | 53.9 ± 9.7 |
| PBTC, 50% | 25 | 95.8 ± 0.6 |
| TF | 25 | 90.9 ± 2.4 |

The results in Table III indicate that the Test Formulation (TF) performed much better than ACUMER 5000 and CAABS and similar to PBTC in the Calcium Shaker Test.

We claim:

1. A process for inhibiting complex scale in an aqueous system containing silica, which comprises, adding to an aqueous system containing silica an effective silica scale inhibiting amount of a scale inhibiting composition comprising:

(a) 2-phosphonobutane-1,2,4- tricarboxylic acid, and (b) a copolymer comprising (1) one or more allyloxybenzenesulfonate monomers, and (2) one or more water-soluble acrylic monomers, substituted acrylic monomers, or mixtures thereof, where the mole ratio of (1) to (2) is from 1:99 to 20:80, and such that the weight ratio of (a) to (b) is from 20:1 to 1:20.

2. The process of claim 1 wherein an effective scale inhibiting amount of the scale inhibiting composition is from 0.1 to 1000 ppm.

3. The process of claim 2 wherein said aqueous system is selected from the group consisting of a cooling water system, a boiling water system, and a geothermal water system, a reverse osmosis system, and a mining water system.

4. The composition of claim 3 wherein the weight ratio of (a) to (b) is from 2:1 to 1:2.

5. The process of claim 4 wherein an effective scale inhibiting amount of the scale inhibiting composition is from 0.1 to 100 ppm.

* * * * *